United States Patent
Kagerer et al.

(10) Patent No.: US 11,866,047 B2
(45) Date of Patent: Jan. 9, 2024

(54) DRIVER ASSISTANCE SYSTEM AND METHOD FOR AUTOMATED DRIVING COMPRISING AUTOMATED LONGITUDINAL GUIDANCE

(71) Applicant: Bayerische Motoren Werke Aktiengesellschaft, Munich (DE)

(72) Inventors: Walter Kagerer, Munich (DE); Dominik Schmoelz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 322 days.

(21) Appl. No.: 17/253,907

(22) PCT Filed: May 28, 2019

(86) PCT No.: PCT/EP2019/063861
§ 371 (c)(1),
(2) Date: Dec. 18, 2020

(87) PCT Pub. No.: WO2019/243007
PCT Pub. Date: Dec. 26, 2019

(65) Prior Publication Data
US 2021/0269036 A1 Sep. 2, 2021

(30) Foreign Application Priority Data
Jun. 19, 2018 (DE) .................... 10 2018 209 910.3

(51) Int. Cl.
*B60W 30/18* (2012.01)
*B60W 30/14* (2006.01)

(52) U.S. Cl.
CPC .... *B60W 30/18163* (2013.01); *B60W 30/146* (2013.01); *B60W 2520/10* (2013.01);
(Continued)

(58) Field of Classification Search
CPC ......... B60W 30/18163; B60W 30/146; B60W 2520/10; B60W 2552/05;
(Continued)

(56) References Cited

U.S. PATENT DOCUMENTS

| 9,302,678 B2* | 4/2016 | Murphy | ............... G05D 1/0274 |
| 2005/0004744 A1* | 1/2005 | Dieckmann | ........ B60K 31/0008 |
| | | | 180/170 |

(Continued)

FOREIGN PATENT DOCUMENTS

| CN | 103702883 A | 4/2014 |
| DE | 103 24 725 A1 | 12/2004 |

(Continued)

OTHER PUBLICATIONS

International Search Report (PCT/ISA/210) issued in PCT Application No. PCT/EP2019/063861 dated Aug. 1, 2019 with English translation (five (5) pages).

(Continued)

*Primary Examiner* — Donald J Wallace
*Assistant Examiner* — Daniel M. Robert
(74) *Attorney, Agent, or Firm* — Crowell & Moring LLP

(57) ABSTRACT

A driver assistance system for a motor vehicle for automated driving includes automated longitudinal guidance, wherein, when automated longitudinal guidance is active in an automatic mode, automated longitudinal guidance is initiated in consideration of a predefinable setpoint speed. The system has a first detection unit, designed to detect a traffic situation in which the vehicle is located on a multi-lane road in a non-passing lane relative to an additional traffic participant detected in an adjacent lane; a second detection unit, designed to detect a defined road class of the road currently being traveled; a third detection unit, designed to detect a defined separate lane of the road currently being traveled;

(Continued)

and an evaluation and control unit, which is designed, when automated longitudinal guidance is active, depending on the detected road class and a detected separate travel lane, to allow or to prevent an overtaking of the additional traffic participant detected in the adjacent lane, in the non-passing lane.

12 Claims, 2 Drawing Sheets

(52) U.S. Cl.
CPC . *B60W 2552/05* (2020.02); *B60W 2554/4041* (2020.02); *B60W 2554/80* (2020.02); *B60W 2555/60* (2020.02)

(58) Field of Classification Search
CPC ..... B60W 2554/4041; B60W 2554/80; B60W 2555/60; B60W 2420/42; B60W 2556/50; B60W 30/143; B60W 30/14
See application file for complete search history.

(56) References Cited

U.S. PATENT DOCUMENTS

| | | | |
|---|---|---|---|
| 2013/0345944 A1 | 12/2013 | Kasiraj et al. | |
| 2016/0176341 A1* | 6/2016 | Raghu | G06V 10/56 348/148 |
| 2016/0325750 A1* | 11/2016 | Kanda | B60W 30/18163 |
| 2017/0082452 A1* | 3/2017 | Sumizawa | B60W 60/001 |
| 2017/0337816 A1* | 11/2017 | Lu | G08G 1/096758 |
| 2018/0297611 A1* | 10/2018 | Fujisawa | G08G 1/167 |
| 2019/0018419 A1* | 1/2019 | Lee | G05D 1/0214 |
| 2019/0278285 A1* | 9/2019 | Umeda | B60W 30/18154 |
| 2021/0046928 A1* | 2/2021 | Ohmura | B60W 50/12 |
| 2021/0269036 A1* | 9/2021 | Kagerer | B60W 30/18163 |

FOREIGN PATENT DOCUMENTS

| | | |
|---|---|---|
| DE | 10 2009 018 006 A1 | 12/2009 |
| DE | 10 2012 210 608 A1 | 12/2013 |
| DE | 10 2016 207 308 A1 | 11/2016 |
| EP | 0 716 949 B1 | 6/1996 |
| EP | 2 562 060 A1 | 2/2013 |

OTHER PUBLICATIONS

German-language Written Opinion (PCT/ISA/237) issued in PCT Application No. PCT/EP2019/063861 dated Aug. 1, 2019 (six (6) pages).

German-language Search Report issued in German Application No. 10 2018 209 910.3 dated Feb. 22, 2019 with partial English translation (13 pages).

German-language Search Report issued in German Application No. 10 2018 209 913.8 dated Feb. 25, 2019 with partial English translation (14 pages).

"Strassenverkehrs-Ordnung (StVO) § 5 Ueberholen", Bundesamt fuer Justiz, Oct. 6, 2017, XP055607803 (one (1) page).

Chinese Office Action issued in Chinese application No. 201980041415.4 dated Apr. 28, 2023, with English Translation (Fifteen (15) pages).

* cited by examiner

DRIVER ASSISTANCE SYSTEM AND METHOD FOR AUTOMATED DRIVING COMPRISING AUTOMATED LONGITUDINAL GUIDANCE

BACKGROUND AND SUMMARY OF THE INVENTION

The invention relates to a driver assistance system for a motor vehicle and a method for a motor vehicle for automated driving comprising automated longitudinal guidance, wherein with active automated longitudinal guidance in an automatic mode, longitudinal guidance is effectuated in consideration of a predefinable target speed.

Motor vehicles having automated longitudinal guidance (so-called cruise control systems) have been known for some time. Most presently available cruise control systems adjust the speed of the motor vehicle to a desired or target speed specified by the driver. In addition to these longitudinal control systems, longitudinal control systems expanded with a distance control, so-called distance-related longitudinal control systems or cruise control systems, can also be purchased from some manufacturers. Such systems, which are offered, for example, in the case of the Applicant of the present patent application under the designation "active cruise control", enable the motor vehicle to be guided automatically while maintaining a desired distance to preceding vehicles at a desired or a corresponding lower speed. The generally known longitudinal control or cruise control, which maintains a specific specified speed, is expanded in principle by an additional distance function or a following travel mode, so that the use of such an "active" cruise control is possible even in dense freeway and highway traffic. This so-called "active cruise control" maintains the specified desired or target speed if the ego lane is free (=free travel mode). If a distance sensor system attached to the motor vehicle, which can operate in particular based on radar, camera and/or laser, recognizes a preceding target object or (motor) vehicle in the ego lane, the ego speed is adapted—for example by effectuating a suitable braking torque or drive torque—to the speed of the preceding motor vehicle in such a way that a distance control included in the "active cruise control" or in the corresponding longitudinal control system automatically maintains a situation-suitable target distance, or more precisely a specified time gap to the preceding motor vehicle or target object (=following travel mode).

The most recent refinements of driver assistance systems comprising automated longitudinal guidance enable (possibly in consideration of a maximum speed or maximum target speed specified by the driver) an automated adaptation of the speed according to the criteria of the Road Traffic Act (StVO—Straßenverkehrsordnung) and driving safety. The vehicle thus generally travels at the permissible highest speed or a suggested speed specified for the corresponding road (target speed), maintains a distance suitable to the external circumstances to preceding vehicles, or brakes appropriately for cornering or turning-off procedures. Such refinements can also be used in the context of an autonomous driving mode.

A travel speed control is known from EP 0 716 949 B1, which fundamentally prevents passing a vehicle on a no-passing lane.

A method for controlling the passing on a non-passing lane of multilane roads is known from DE 103 24 725 A1, wherein passing a vehicle located on the adjacent lane is permitted on a no-passing lane if a column has formed on the adjacent lane on which the vehicle to be passed is located. If it is only a single vehicle, passing this vehicle on the no-passing lane is not permitted.

The object of the invention is to provide a system improved with respect to the comfort of the vehicle occupants and a corresponding method for a driver assistance system comprising automated longitudinal guidance, which comprehensibly assists the driver.

This object is achieved by a driver assistance system, a method, and a correspondingly designed computer program product, having the features of the independent claims. Further advantageous designs are specified in the dependent claims.

The invention starts from a fundamentally known driver assistance system (cruise control system) for a motor vehicle for automated driving comprising automated longitudinal guidance, wherein with active automated longitudinal guidance, the longitudinal guidance (depending on the traffic environment) can either take place in an automatic mode designed as the free travel mode explained at the outset or an automatic mode designed as a following travel mode. With active automated longitudinal guidance in an automatic mode, automated longitudinal guidance is effectuated in consideration of an—automatically or manually—predefinable target speed.

The invention is based on the finding that such driver assistance systems, which can effectuate automated longitudinal guidance of the vehicle, already have the ability of being able to incorporate objects which are located on adjacent lanes into the control or longitudinal guidance.

Furthermore, the invention is based on the finding that because of the legal specifications in some countries, passing other road users on so-called no-passing lanes is fundamentally not allowed, but is permitted in specific situations. Thus, for example passing or driving past on a so-called no-passing lane is permitted in the case of driving in columns at low speeds. Passing on a no-passing lane is also permitted if this lane turns off from the presently traveled road and opens into another road.

To be able to offer the driver automated longitudinal guidance comprehensible to him, according to the invention a system is proposed which recognizes such "exceptional situations", in which "passing" is allowed on a so-called no-passing lane, and offers corresponding automated longitudinal guidance.

Against this background, according to a first aspect of the present invention, a driver assistance system for a motor vehicle for automated driving comprising automated longitudinal guidance is proposed, wherein in general with active automated longitudinal guidance in an automatic mode (=following travel mode or free travel mode), automated longitudinal guidance is effectuated in consideration of a predefinable target speed. This driver assistance system comprises:
- a first recognition unit, designed to recognize a traffic situation in which the vehicle on a multilane road is located on a no-passing lane with respect to a further road user detected on an adjacent lane;
- a second recognition unit, designed to recognize a defined road class of the presently traveled road;
- a third recognition unit, designed to recognize a defined special lane of the presently traveled road; and
- an evaluation and control unit, designed, with active automated longitudinal guidance in dependence on the recognized road class and a recognized special lane, to permit or prevent passing of the further road user detected on the adjacent lane on the no-passing lane.

Similarly thereto, according to a further aspect of the invention, a method for automated driving comprising automated longitudinal guidance is proposed, wherein with active automated longitudinal guidance in an automatic mode, automated longitudinal guidance is effectuated in consideration of a predefinable target speed, and the method comprises the following steps:

recognizing a traffic situation in which the vehicle on a multilane road is located on a no-passing lane with respect to a further road user detected on an adjacent lane;

recognizing a defined road class of the presently traveled road;

recognizing a defined special lane of the presently traveled road; and with active automated longitudinal guidance in dependence on the recognized road class and a recognized special lane, permitting or preventing passing of the further road user detected on the adjacent lane on the no-passing lane.

Refinements proposed hereinafter apply both to the system according to the invention and also to the method according to the invention, in particular also for a computer program product having control commands which execute the proposed method when it is executed on a computer.

The term "automated driving" can be understood in the context of the document as driving comprising automated longitudinal guidance or autonomous driving comprising automated longitudinal and lateral guidance. The term "automated driving" comprises automated driving having an arbitrary degree of automation. Exemplary degrees of automation are assisted, partially automated, highly automated, or fully automated driving. These degrees of automation were defined by the Federal Highway Research Institute (BASt) (see BASt publication "Forschung kompakt [compact research]", issue November 2012). In assisted driving, the driver continuously executes the longitudinal or lateral guidance, while the system takes over the respective other function within certain limits.

The motor vehicle can be any type of vehicle having a drive system which is designed to participate in road traffic and permit automated intervention in the longitudinal guidance. The drive system can be, for example a conventional drive system having an internal combustion engine, a hybrid drive system having an internal combustion engine and electric motor, or a solely electrically operated drive system. Other drive systems are also conceivable.

The target speed can either be specified manually by the driver or automatically. In the case of a specification which is automated or can be influenced automatically, the target speed can be specified in dependence on a permissible highest speed or a suggested speed specified for the corresponding road (target speed).

The first recognition unit, which is designed to recognize a traffic situation in which the vehicle on a multilane road is located on a no-passing lane with respect to a further road user detected on an adjacent lane, can for this purpose evaluate relevant sensor signals (for example speed sensor signals, camera signals, etc.) or access detected and/or processed signals of other systems or units. A no-passing lane of a multilane road is to be understood in the meaning of a lane of the multilane road in which due to its (lateral) arrangement with respect to a neighboring adjacent lane, in general passing of vehicles which are located on this neighboring adjacent lane is not allowed due to generally valid rules and/or guidelines. Thus, for example in Germany passing on the right is forbidden, which forbids passing slower road users on a multilane road who are located on a neighboring lane arranged to the left of the ego lane (this can also be the lane adjacent to the neighboring lane).

The second recognition unit, which is designed to recognize a defined road class of the presently traveled road, can also evaluate relevant sensor signals or access detected and/or processed signals of other systems or units. In particular, the second recognition unit can access items of information of a route guidance system having an integrated map system, and thus be able to receive information about the road class of the presently traveled road. The first and second recognition unit can be formed as separate units, can be combined into one unit, or can be part of the evaluation and control unit.

The third recognition unit, which is designed to recognize a defined special lane of the presently traveled road, can evaluate relevant sensor signals or access detected and/or processed signals of other systems or units (for example a navigation system), similarly to the second recognition unit. For example, those lanes are to be understood in terms of a special lane which, in addition to the function of a supplementary option for traveling the road, comprise a special function, in particular an option of forking and/or turning off from the presently traveled road. The special lane can be the ego lane or a lane (directly) neighboring to the ego lane. This third recognition unit can be formed as a separate unit, can be part of the first and/or second recognition unit, and/or can be part of the evaluation and control unit.

The third recognition unit is advantageously designed to recognize a special lane by evaluating provided items of information about a lane marking delimiting the lane and/or provided items of information of a digital map system, which is placed in the vehicle or is connectable to the vehicle. An evaluation of the lane markings is particularly advantageous, since special lanes are generally identified by unique lane markings (for example thicker markings, arrows, etc.). The data of an optical sensor system (for example camera) can advantageously be evaluated to recognize the lane markings.

The evaluation and control unit, which is designed, with active automated longitudinal guidance in dependence on the recognized road class and the recognized lane or a recognized special lane, to permit or prevent passing of the further road user detected on the adjacent lane on the no-passing lane, can either send corresponding activation signals directly to an actuator (drive, brake) influencing the longitudinal guidance or to an interconnected unit, which effectuates corresponding interventions in the longitudinal guidance on the basis of this request and possibly further requests for the longitudinal acceleration.

In one advantageous design of the invention, the evaluation and control unit is designed to permit passing of a or the further road user detected on the adjacent lane on the no-passing lane if a specified combination of specified defined road class and specified defined lane (the ego lane or an adjacent lane) is recognized.

A traffic situation in which passing or driving past other road users is supposed to be permitted is, for example, given on freeways at the transition into another freeway or at the division of the freeway into two freeways. The evaluation and control unit can thus advantageously be designed to permit passing of the further road user detected on the adjacent lane on the no-passing lane if a freeway or freeway-like road class is identified as the road class, and the ego or adjacent lane, which actually represents a passing lane with respect to the ego lane, is a freeway dividing lane as a special lane, which represents a transition to a further freeway or freeway-like road.

Similar traffic situations can also result on highways. The evaluation and control unit can thus alternatively or additionally be designed to permit passing of the further road user detected on the adjacent lane on the no-passing lane if a highway or highway-like road class is recognized as the road class and (for the directly adjacent lane), a lane having an option to turn off to the left is recognized as a special lane. This special lane is identical to the adjacent lane on which the further road user is located.

In addition to the above conditions, alternatively or additionally further parameters can be evaluated and taken into consideration with respect to permitting or preventing a passing procedure on a no-passing lane. In a further advantageous design of the invention, the evaluation and control unit can thus be designed to always permit passing of the further road user detected on the adjacent lane on the no-passing lane, regardless of the recognized road class and a recognized special lane, if the speed of the ego vehicle is not greater (or less) than a specified minimum speed. If a speed less than the specified minimum speed is recognized, an above-explained ascertainment and evaluation of road class and lane can thus be omitted, and driving past or passing on a no-passing lane can always be permitted. A speed greater than 40 km/h, in particular greater than 50 km/h or 60 km/h can be specified as the minimum speed. Alternatively and/or additionally, such passing or driving past can also only be permitted or not permitted in specific driving modes (free travel mode or following travel mode).

If, with active automated longitudinal guidance, passing of the further road user detected on the adjacent lane on a no-passing lane is permitted, longitudinal guidance is supposed to be effectuated during the passing procedure such that a comfortable and trustworthy passing procedure is executed. For this purpose, the evaluation and control unit can advantageously be designed, if passing is permitted on the no-passing lane of the further road user detected on the adjacent lane, to activate a passing mode, in particular a passing mode having adapted target parameters for the automated longitudinal guidance.

In the context of the passing mode or without activation of a special passing mode, the evaluation and control unit can furthermore be designed, in the case of permitted passing of the further road user detected on the adjacent lane on the no-passing lane, to permit or take into consideration a defined maximum limiting speed differing from the specified target speed. In this case, the maximum limiting speed can be specified in dependence on the present speed of the ego vehicle and/or the speed of the road user to be passed and/or the presently applicable (maximum) target speed. Ideally, a speed can be specified as the maximum limiting speed, which is greater by at most a specified defined offset value (for example range from 10 km/h-30 km/h, in particular 20 km/h), than the present speed of the road user to be passed, wherein, however, in particular the specified (generally valid) target speed cannot be exceeded or can only be exceeded by a small delta (variable, at most 10 km/h).

The invention will now be explained in greater detail on the basis of the following exemplary embodiment.

DETAILED DESCRIPTION OF THE DRAWINGS

Figure 1:
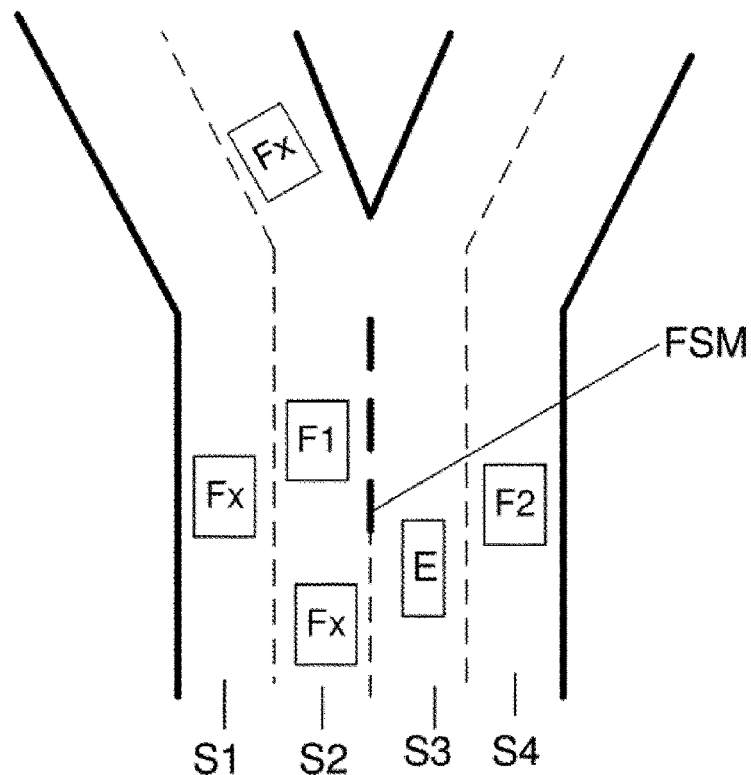
FIG. 1 shows a traffic situation relevant for the invention.
Figure 2:
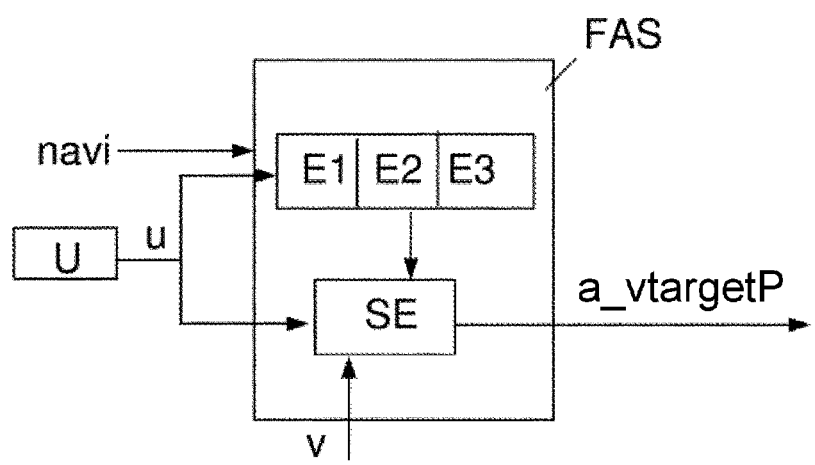
FIG. 2 shows an exemplary structure of a driver assistance system according to an embodiment of the invention.

The traffic situation illustrated in FIG. 1 shows a 4-lane freeway having the lanes S1, S2, S3, and S4, wherein the two left lanes S1 and S2 open into a freeway continuing to the left, and both right lanes S3 and S4 open into a freeway continuing to the right. In addition to the vehicle E, which is equipped with an exemplary driver assistance system according to the invention as shown in FIG. 2, further road users F1, F2, and Fx are located on the freeway. According to the German Road Traffic Act, passing other road users on the right is not allowed, i.e., the vehicle F2 cannot pass the vehicle E, the vehicle E cannot pass the vehicle F1, etc. Although passing is not permitted, passing in the sense of "driving past" road users located on the left adjacent lane is permitted under specific conditions.

Thus, for example, driving past is permitted when a freeway divides. In present FIG. 1, this roadway division is already shown in the foreground by the thicker lane boundary line FSM shown between lane S2 and S3. From the thicker lane boundary line FSM, the vehicle E is allowed to drive past the vehicle F1.

To be able to drive through such a traffic situation comfortably even with automated longitudinal guidance, FIG. 2 shows a structure of a driver assistance system FAS for a motor vehicle for automated driving comprising automated longitudinal guidance, wherein with active automated longitudinal guidance in the automatic mode, longitudinal guidance is effectuated in consideration of a predefinable target speed.

The driver assistance system FAS comprises an evaluation and control unit SE, which, with active automated longitudinal guidance in the automatic mode, effectuates a speed control in consideration of a predefinable target speed in the automatic mode (free travel mode or following travel mode) based on available items of information. This so-called "active cruise control" maintains the specified desired or target speed if the ego lane is free (=free travel mode). If a distance sensor system, which can operate in particular based on radar, camera and/or laser, attached to the motor vehicle recognizes a preceding target object or (motor) vehicle in the ego lane, the ego speed is adapted to the speed of the preceding motor vehicle—for example by effectuating a suitable braking or drive torque—in such a way that a distance control contained in the "active cruise control" or in the corresponding longitudinal control system automatically maintains a situation-suitable target distance, or more precisely a specified time gap to the preceding motor vehicle or target object (=following travel mode). If a brake pedal actuation is detected in the automatic mode, the automated longitudinal guidance is at least interrupted.

Furthermore, the driver assistance system FAS comprises a recognition unit, in which a first, second, and third recognition unit E1, E2, and E3 are integrated. This recognition unit receives the data u of a provided surroundings sensor system U (for example camera) and/or route guidance data navi, and evaluates these data accordingly.

The first recognition unit E1 is designed to recognize a traffic situation in which the vehicle (for example vehicle E from FIG. 1) on a multilane road is located on a no-passing lane (S3 from FIG. 1) with respect to a further road user (for example F1 from FIG. 1) detected on an adjacent lane (S2 from FIG. 1). The second recognition unit E2 is designed to recognize a defined road class of the presently traveled road. The third recognition unit E3 is designed to recognize a defined special lane of the presently traveled road (for example turnoff lane from the marking FSM in FIG. 1). This special lane can either be the lane on which the vehicle having the exemplary driver assistance system according to the invention is located, or one of the other lanes of the presently traveled road.

The situations and/or items of information recognized by the three ascertainment units E1, E2, and E3 are transferred to the evaluation and control unit SE, which is designed, with active automated longitudinal guidance, to permit or prevent passing of the further road user detected in relation to the ego vehicle on the adjacent lane on the no-passing lane in dependence on the recognized road class and a recognized special lane.

The evaluation and control unit SE permits passing or driving past in the case of the following conditions or recognized combinations of road class and special lane:

(1) The present speed of the vehicle v of the vehicle is less than a specified minimum speed.

(2) A freeway or freeway-like road class is recognized as the road class, and a freeway dividing lane, which represents a transition to a further freeway or freeway-like road, is recognized as the special (for example ego) lane. For this purpose, for example data of camera systems can be evaluated. By incorporating camera data, when wide-dashed lane marking begins on freeways, a division of freeways can be recognized and driving past objects on the left adjacent lane can be permitted. By additionally evaluating navigation data, this situation can be distinguished from travel on acceleration and deceleration lanes (identical lane marking).

(3) A highway or highway-like road class is recognized as the road class, and a lane having an option to turn off to the left is recognized as the special (for example adjacent) lane. For this purpose, navigation data can be evaluated and thus, for example, options to turn off to the left can be predictively recognized on highways. In this situation, it is possible to drive past an object traveling on the adjacent lane and decelerating.

In principle, the evaluation and control unit SE is designed to detect and evaluate a speed signal v of the vehicle. If the present speed v is less than a specified minimum speed, driving past or passing is fundamentally permitted, i.e. independently of the road class and lane on which the vehicle is located. However, if the speed v is not less than the specified minimum speed, in addition one of the above-mentioned combinations of road class and lane has to be recognized. If one of the above-mentioned combinations of recognized road class and special lane is recognized, the evaluation and control unit (SE) permits passing of the further road user detected on the adjacent lane on the no-passing lane. For this purpose, the evaluation and control unit SE sends a signal a_vtargetP to permit the passing procedure when a passing procedure of other road users which are located on an adjacent lane and normally cannot be passed is permitted.

The signal a_vtargetP is configured in such a way that, on the one hand, it permits "passing on the right" and, on the other hand, it effectuates an acceleration (or possibly deceleration) of the vehicle in consideration of specified other boundary conditions (free travel mode, following travel mode, set maximum speed, maximum permitted speed) and in particular a defined maximum limiting speed applicable for the passing procedure and possibly differing from the specified target speed. This defined maximum limiting speed differing from the specified target speed is composed here of the total of the speed of the road user to be passed on the right and a defined offset value.

Figure 3:
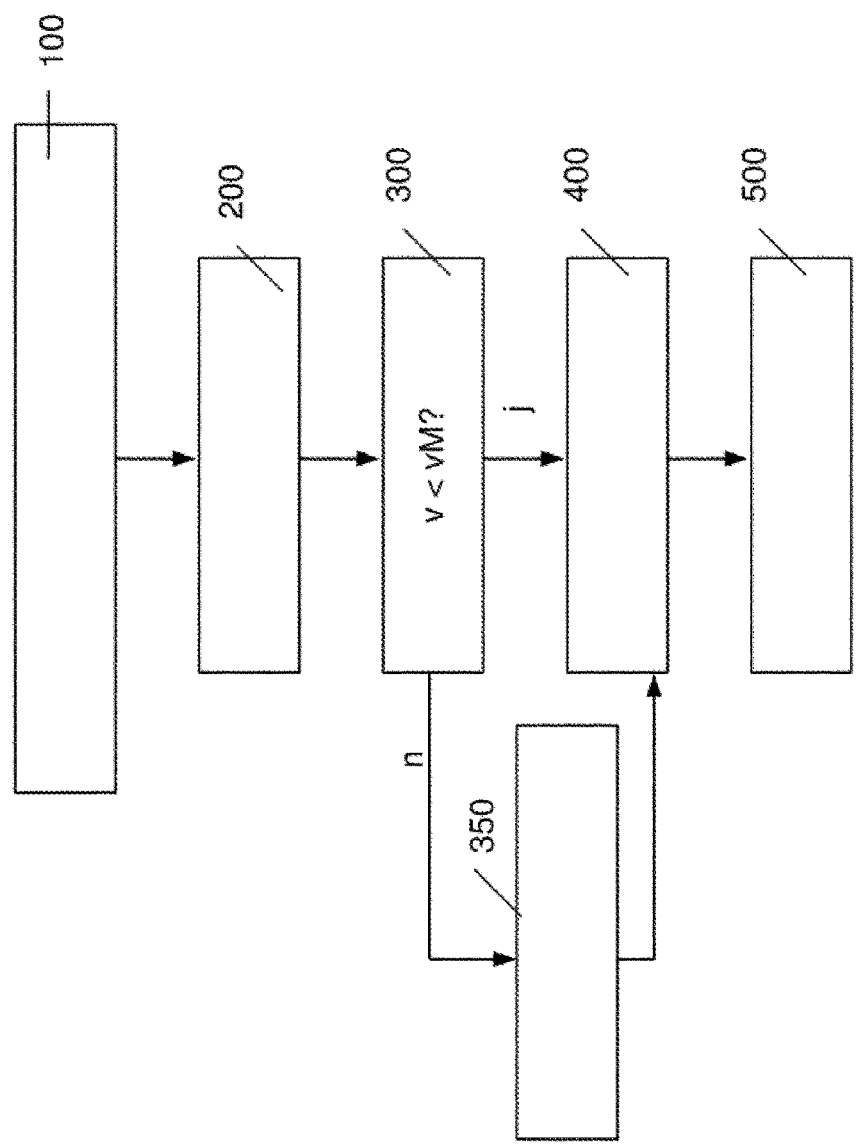
FIG. 3 shows a simplified flow chart for a method according to an embodiment of the invention.

FIG. 3 shows a detailed exemplary design of the method according to the invention. The flow chart shown in FIG. 3 begins in step 100, as soon as automated longitudinal guidance is active and a speed control takes place in an automatic mode (in particular free travel mode) in consideration of a predefinable target speed.

Starting from step 100, in step 200, required items of information which allow recognition of a defined traffic situation, in which passing or driving past a road user detected on an adjacent lane is permitted on a no-passing lane arranged in relation to this adjacent road user are ascertained and evaluated. For this purpose, the following individual steps are executed:

recognizing a traffic situation in which the vehicle on a multilane road is located on a no-passing lane with respect to a further road user detected on an adjacent lane;

recognizing a defined road class of the presently traveled road;

recognizing a defined special lane of the presently traveled road; and ascertaining the ego speed.

In step 300, the speed of the vehicle is evaluated. If a speed is recognized which is less than a specified minimum speed ((v<vM)=j), the sequence passes from step 300 directly to step 400.

However, if the speed is not less than the specified minimum speed ((v<vM)=n), the sequence passes to step 350.

In step 350, passing of the further road user detected on the adjacent lane on the no-passing lane is permitted or prevented in dependence on the recognized road class and the recognized lane.

If passing is permitted, in step 400, a passing speed is ascertained in consideration of the detected speed of the adjacent road user to be passed. This passing speed is ascertained based on the target speed allowed for the normal longitudinal control and a defined maximum limiting speed which is maximally allowed for this passing procedure. The defined maximum limiting speed is ascertained from the total of the speed of the road user to be passed and a defined offset value (for example 20 km/h). The passing speed is then the lesser of the two speeds (target speed or maximum limiting speed).

In step 500, the passing procedure is executed in consideration of all ascertained parameters. After a drive past is initiated in the above situations, a comfortable and trust-promoting differential speed in relation to the respective relevant object on the (left) adjacent lane is set as long as objects are located on this lane (for example driving past a column). The vehicle only accelerates to the original target speed after passing all vehicles—if the traffic situation permits it.

The acceptance of cruise control systems which prevent passing on the right on freeways can be increased by the expansion of the function offering (permitting passing on the right in specific situations) by this invention.

What is claimed is:

1. A driver assistance system of a motor vehicle, comprising:
    a first recognition unit that identifies a traffic situation in which the motor vehicle located in a no-passing lane of a multilane road with respect to a further road user detected in an adjacent lane;
    a second recognition unit that identifies a road class of the multilane road;
    a third recognition unit that identifies a special lane of the multilane road; and
    an evaluation and control unit that controls an automated longitudinal guidance of the motor vehicle, while in an automatic driving mode, so as to: prevent the motor vehicle from passing the detected further road user upon identification of the traffic situation by the first recognition unit, except to permit the motor vehicle to pass the detected further road user upon determination of an exception scenario, wherein the exception scenario is identified based on one or more of: a speed of the motor vehicle, the road class, and the special lane.

2. The driver assistance system according to claim 1, wherein the third recognition unit identifies the special lane by evaluating available items of information about a lane marking delimiting the lane and/or available items of information of a digital map system.

3. The driver assistance system according to claim 1, wherein the exception scenario is determined as a specified combination of the road class and the special lane.

4. The driver assistance system according to claim 1, wherein the exception scenario is determined when a freeway or freeway-like road class is recognized as the road class and a freeway division lane, which represents a transition to a further freeway or freeway-like road, is recognized as the special lane.

5. The driver assistance system according to claim 1, wherein the exception scenario is determined when a highway or highway-like road class is recognized as the road class and a lane having an option to turn off to the left is recognized as the special lane.

6. The driver assistance system according to claim 3, wherein the exception scenario is determined when the speed of the motor vehicle is less than a specified minimum speed.

7. The driver assistance system according to claim 4, wherein the exception scenario is determined when the speed of the motor vehicle is less than a specified minimum speed.

8. The driver assistance system according to claim 5, wherein the exception scenario is determined when the speed of the motor vehicle is less than a specified minimum speed.

9. The driver assistance system according to claim 1, wherein the exception scenario is determined when passing the further road user is permitted in the no-passing lane.

10. The driver assistance system according to claim 1, wherein the exception scenario is determined when passing of the further road user is permitted in the no-passing lane.

11. The driver assistance system according to claim 1, wherein, when permitting the motor vehicle to pass the detected further road user upon determination of the exception scenario, the evaluation and control unit sets a maximum limiting speed for the motor vehicle that is determined by adding a speed of the further road user and a defined offset value.

12. A method for automated driving, the method comprising:
    recognizing a traffic situation in which the motor vehicle is located in a no-passing lane of a multilane road with respect to a further road user detected in an adjacent lane;
    identifying a road class and a special lane of the multilane road; and
    controlling an automated longitudinal guidance of the motor vehicle, while in an automatic driving mode, so as to: prevent the motor vehicle from passing the detected further road user upon identification of the traffic situation by the first recognition unit, except to permit the motor vehicle to pass the detected further road user upon determination of an exception scenario, wherein the exception scenario is identified based on one or more of: a speed of the motor vehicle, the road class, and the special lane.

* * * * *